US008824964B2

(12) United States Patent
Baliga

(10) Patent No.: US 8,824,964 B2
(45) Date of Patent: Sep. 2, 2014

(54) SYSTEM FOR PROXIMITY BASED AD-HOC DATA SHARING ACROSS DEVICES WITH INTUITIVE INTERFACES

(75) Inventor: Arati Baliga, Edison, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 396 days.

(21) Appl. No.: 12/963,390

(22) Filed: Dec. 8, 2010

(65) Prior Publication Data
US 2012/0149304 A1  Jun. 14, 2012

(51) Int. Cl.
*H04B 7/00* (2006.01)
(52) U.S. Cl.
USPC .......................... 455/41.2; 455/41.1; 455/418
(58) Field of Classification Search
USPC ........................................ 455/41.1, 41.2, 418
See application file for complete search history.

(56) References Cited

U.S. PATENT DOCUMENTS

2009/0300549 A1* 12/2009 Wang et al. .................... 715/835
2011/0014871 A1*  1/2011 Sato et al. ..................... 455/41.2

* cited by examiner

*Primary Examiner* — Tuan H Nguyen
(74) *Attorney, Agent, or Firm* — Akerman LLP; Michael K. Dixon; Roy P. Zachariah

(57) ABSTRACT

A system for transferring data between devices with user via a short range wireless communication system is disclosed. The system may include a first device configured to activate an intuitive interface on the first device having a system for proximity based ad-hoc data sharing between the first device with an intuitive interface and at least a second device with an intuitive interface. Once, the first device is determined to be within range of a second device with proximity based ad-hoc data sharing, data may be received by the intuitive interface on the first device and data may be sent from the intuitive interface on the first device to an intuitive interface on the second device using an intuitive interface on the first device without relying on an external communication network. The data may be transferred with a single click to the receiving device in a paste-to format.

20 Claims, 1 Drawing Sheet

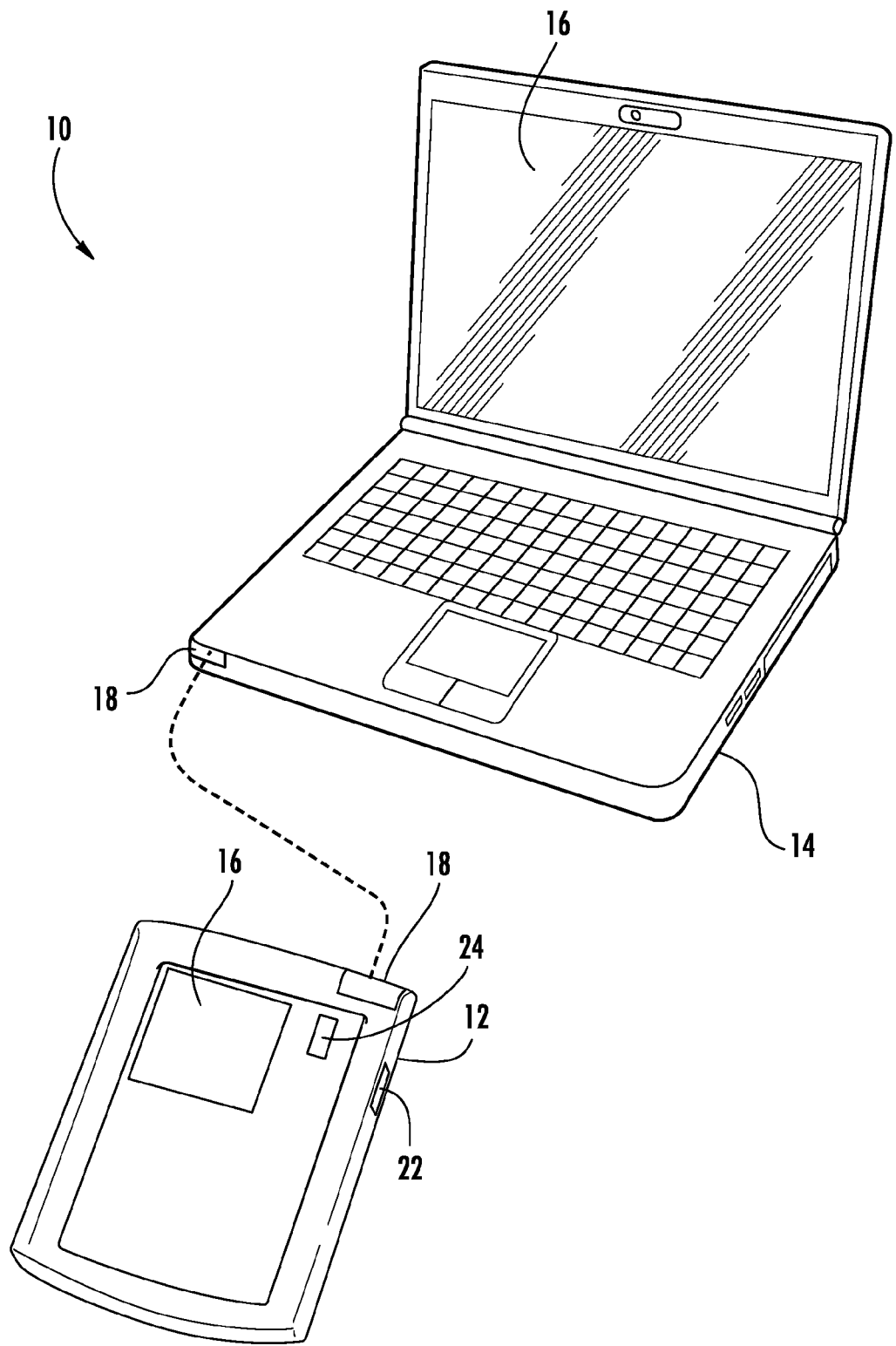

US 8,824,964 B2

SYSTEM FOR PROXIMITY BASED AD-HOC DATA SHARING ACROSS DEVICES WITH INTUITIVE INTERFACES

FIELD OF THE INVENTION

The present application relates to proximity based data sharing and, more particularly, to a system for proximity based ad-hoc data sharing across devices with intuitive interfaces.

BACKGROUND

It is common today for electronics users to own a plethora of communication devices, such as laptops, smartphones, and others. Users often have the desire to share relatively small amounts of data from one device to another. For example, one user with a smartphone may desire to share a URL, a small data file, the contact information for a friend, browser bookmarks and the like with another user having only a laptop available. Currently, the information may only be shared by sending the data via email or by saving the data in a file and launching smartphone applications to send the data. Although these methods are functional, a more efficient method of data sharing is needed.

SUMMARY

A system for transferring data between devices with intuitive interfaces via a short range wireless communication system is disclosed. The system may include a first device configured to activate an intuitive interface on the first device having the system for proximity based ad-hoc data sharing between the first device with an intuitive interface and at least a second device with an intuitive interface once the first device is determined to be within range of a second device. The intuitive interface may be made visible by right clicking after selection from a cut to-device and copy-to device menu. Upon activation, data may be received by the intuitive interface on the first device and the data may be sent from the intuitive interface on the first device to an intuitive interface on the second device using the intuitive interface on the first device without relying on an external communication network. The data may be transferred with a single click to the receiving device in a paste-to format.

The system may include a first device configured to activate an intuitive interface on the first device having a system for proximity based ad-hoc data sharing between the first device with an intuitive interface and at least a second device with an intuitive interface. The first device may be configured to send a signal to the second device to determine whether the second device includes a system for proximity based ad-hoc data sharing across the first and second devices and to determine whether the first device is in range of communication of the second device. The first device may be configured to receive data into the intuitive interface on the first device and send the data from the intuitive interface on the first device to an intuitive interface on the second device using an intuitive interface on the first device without relying on an external communication network. The intuitive interface of the first device may be a cut-to-device intuitive interface, a copy-to-device intuitive interface, a paste-from-device intuitive interface or other appropriate interface. The intuitive interface and system may stored within an operating system on the first device. The intuitive interface may be activated with a single input device on the first device. The intuitive interface may be activated on the first device after text to be copied has been selected and a copy-to-device menu selection has been chosen.

The first device may be configured to receive data at a current cursor location on the intuitive interface of the first device by activating a paste-from-device intuitive interface, wherein the data is received from the intuitive interface on the second device. In one embodiment, the first device may be heterogeneous with the second device. In one example, the first device may be a smartphone, and the second device may be a laptop computer. In another embodiment, the first device may be homogeneous with the second device.

A method of transferring data between devices with intuitive interfaces via a short range wireless communication system is also disclosed. The method may include the activating the intuitive interface on the first device having the system for proximity based ad-hoc data sharing between the first device with an intuitive interface and at least a second device with an intuitive interface. Activating the intuitive interface on the first device may include activating an interface such as, but not limited to, a cut-to-device intuitive interface, a copy-to-device intuitive interface, and a paste-from-device intuitive interface. Activating the intuitive interface may be done by activating a single input device on the first device. In particular, activating the intuitive interface 16 may be completed by clicking a single input button on the device 12.

The method may also include sending a signal to the second device to determine whether the second device includes the system for proximity based ad-hoc data sharing across the first and second devices and to determine whether the first device is in range of communication of the first device. Sending the signal to the second device may include establishing a wireless communication channel between the first and second devices. Establishing a wireless communication channel between the first and second devices may include establishing a wireless communication channel via the short range wireless communication system.

The method may also include activating a menu including a cut-to-device function and a copy-to-device function when the second device is determined to be within range of the first device. Data may be received into the intuitive interface on the first device. Data may be sent from the intuitive interface on the first device to an intuitive interface on the second device using the intuitive interface on the first device without relying on an external communication network. The method may also include receiving data from the intuitive interface on the second device on the intuitive interface on the first device such that that the information may be received on the first device at a current cursor location by activating a paste-from-device interface.

An advantage of the system for transferring data between devices with intuitive interfaces via a short range wireless communication system is that two or more devices may send data, such as but not limited to, a URL with directions, a small data file, contact information of a friend, and browser bookmarks, between the devices is a very convenient ad-hoc manner by providing an intuitive user interface.

These and other features of the passive measurement system are described in the following detailed description, drawings, and appended claims.

BRIEF DESCRIPTION OF THE DRAWINGS

FIG. 1 is a schematic view of a system for transferring data between devices with intuitive interfaces via a short range wireless communication system according to an embodiment of the present invention.

DETAILED DESCRIPTION OF THE INVENTION

As shown in FIG. 1, the exemplary embodiments of the present disclosure are described with respect to a system 10 for transferring data between devices 12, 14 with intuitive interfaces 16 via a short range wireless communication system 18. The system 10 may include a first device 12 configured to activate an intuitive interface 16 on the first device 12 having the system 10 for proximity based ad-hoc data sharing between the first device 12 with an intuitive interface 16 and at least a second device 14 with an intuitive interface 16. Once, the first device 12 is determined to be within range of a second device 14 with proximity based ad-hoc data sharing, data may be received by the intuitive interface 16 on the first device 12 and data may be sent from the intuitive interface 16 on the first device 12 to an intuitive interface on the second device 14 using the intuitive interface 16 on the first device 12 without relying on an external communication network. The data may be transferred with a single click to the receiving device in a paste-to format.

The system 10 may include a first device 12 may be any electronic device. For instance, the first device 12 may be a wireless communications device, such as, but not limited to, a cellular phone, a personal digital assistant (PDA), a smartphone, a machine including, but not limited to, a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device. The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

The second device 14 may be formed from one or more of the devices described as being the first device 14 above. The second device 14 may be a combination of one or more of the devices listed as being a first device 12. In at least one embodiment, the first and second devices 12, 14, may be homogeneous. For example, the first and second devices 12, 14 may both be smartphones, may both be laptop computers, or may be other devices as listed above. In another embodiment, the first and second devices 12, 14, may be heterogeneous. For example, the first device 12 may be a smartphone, and the second device 14 may be a laptop computer in communication via BLUETOOTH.

In at least one embodiment, the system 10 may be stored within an operating system on the first device 12 or other appropriate place. The system 10 may also use local interfaces, such as, but not limited to, desktop graphical user interfaces (GUIs), on the first and second devices 12, 14. The system 10 may be configured to communicate from a first device 12 to a second device 14 via a short range wireless communication system 18, such as, but not limited to a BLUETOOTH system. Communicating from the first device 12 to the second device 14 via the short range wireless communication system 18 reduces the number of steps necessary for a user to transmit data to the second device 14. An example of usefulness of the system 10 is a situation in which a user desires to send URL, a telephone no. or other such information to a friend. The system 10 may also be extended to send other types of items, such as, but not limited to, file sharing, copy and pasting other kinds of objects, such as images, into documents. The user may use the first device 12 to send the data to the second device 14 easily using the system 10.

The system 10 on the first device 12 may determine whether the first device 12 is within communication range of another device, such as, but not limited to the second device 14, containing the system 10. A signal may be sent to the second device 14 to determine whether the second device 14 includes a system 10 for proximity based ad-hoc data sharing across the first and second devices 12, 14 and to determine whether the first device 12 is in range of communication of the second device 14. Once the first device 12 is within range of another device with the system 10, the system in the first device 12 is activated to enable a user to open the intuitive interface 16. In at least one embodiment, the system 10 may only be activated in the first device 10 once another device having the system 10 is determined to be within communications range.

The system 10 may activate the intuitive interface 16 on the first device 12 having a system 10 for proximity based ad-hoc data sharing between the first device 12 with an intuitive interface 16 and at least the second device 14 with an intuitive interface 16. In at least one embodiment, a user may open the intuitive interface 16 by simply clicking a single input device 22. The input device 22 may be, but is not limited to being, an icon 24 on the intuitive interface 16, a button on the first device 12, or other appropriate device. In one embodiment, the intuitive interface 16 may be opened by simply right clicking on a selection. Thus, a user may simply click an icon 24 or button once to get the intuitive interface 16 to open.

Data may be chosen or inputted into the first device 12 before or after the system 10 has been activated in the first device 12. Once the system 10 is activated in the first device 12, data previously chosen may populate the intuitive interface 16. The first device 12 may also receive data into the intuitive interface 16 on the first device 12. For example, if data has not previously been chosen, data may be inputted into the intuitive interface 16. The intuitive interface 16 of the first device 12 may include a cut-to-device intuitive interface, a copy-to-device intuitive interface, or a paste-from-device intuitive interface, combinations thereof, and other appropriate intuitive interfaces 16. When the first device 12 detects the presence of another device with the system 10, the cut-to-device intuitive interface and copy-to-device intuitive interfaces would become active. In at least one embodiment, the intuitive interface 16 may be activated on the first device 12 after text to be copied has been selected and a copy-to-device menu selection has been chosen.

Data may be sent from the intuitive interface 16 on the first device 12 to an intuitive interface 16 on the second device 14 using an intuitive interface 16 on the first device 12 without relying on an external communication network. Data may be sent by activating a single input device 22, which may be the same or different from the input device 22 used to activate the system 10 on the first device 12.

The second device 14 may be configured to receive data at a current cursor location on the second device 14. The data may be received by a user selecting a paste-to-device option within the system 10. The data may be received in whatever window is open and at the location of the cursor within that window. In particular, the system 10 on the second device 14 may cause an intuitive interface 16 on the second device 14 to open and may cause the data received from the first device 12 to appear within an intuitive interface 16 in the second device 14. Thus, the system 10 use the intuitive cut-paste interface to transfer data across devices.

The first device 12 may function similarly in that the first device 12 may also be configured to receive data as well as transmit data. In particular, the first device 12 may be configured to receive data at a current cursor location on the intuitive interface 16 of the first device 12 by activating a paste-from-device intuitive interface, thereby causing data to be received from the intuitive interface 16 on the second device 14.

A method of transferring data between devices with intuitive interfaces 16 via a short range wireless communication system 18 is also disclosed. The method may include the activating the intuitive interface 16 on the first device 12 having the system 10 for proximity based ad-hoc data sharing between the first device 12 with an intuitive interface 16 and at least a second device 14 with an intuitive interface 16. Activating the intuitive interface 16 on the first device 12 may include activating an interface 16 such as, but not limited to, a cut-to-device intuitive interface, a copy-to-device intuitive interface, and a paste-from-device intuitive interface. Activating the intuitive interface 16 may be done by activating a single input device 22 on the first device 12. In particular, activating the intuitive interface 16 may be completed by clicking a single input button on the device 12. In one embodiment, activating the intuitive interface 16 on the first device 12 may be possible after text to be copied has been selected and a copy-to-device menu selection has been chosen. The method may include activating the intuitive interface on the first device 12, wherein the first device 12 is homogeneous with the second device 14. In another embodiment, the method may include activating the intuitive interface on the first device 12, wherein the first device 12 is heterogeneous with the second device 14. The method may also include activating the intuitive interface 16 on a first device 12 that is stored within an operating system on the first device 12.

The method may also include sending a signal to the second device 14 to determine whether the second device 14 includes the system 10 for proximity based ad-hoc data sharing across the first and second devices 12, 14 and to determine whether the first device 12 is in range of communication of the first device 12. Sending the signal to the second device may include establishing a wireless communication channel between the first and second devices 12, 14. Establishing a wireless communication channel between the first and second devices 12, 14 may include establishing a wireless communication channel via the short range wireless communication system, which may be, but is not limited to being, BLUETOOTH.

The method may also include activating a menu including a cut-to-device function and a copy-to-device function when the second device 14 is determined to be within range of the first device 12. Data may be received into the intuitive interface 16 on the first device 12. Data may be sent from the intuitive interface 16 on the first device 12 to an intuitive interface 16 on the second device 14 using the intuitive interface 16 on the first device 12 without relying on an external communication network. The method may also include receiving data from the intuitive interface on the second device 14 on the intuitive interface 16 on the first device 12 such that that the information may be received on the first device 12 at a current cursor location by activating a paste-from-device interface.

In another embodiment of the invention, a computer-readable medium may include instructions, which, when loaded and executed by an electronic processor, causes the electronic processor to transfer data between devices 12, 14 with user via a short range wireless communication system. The instructions may include activating an intuitive interface 16 on a first device 12 having a system 10 for proximity based ad-hoc data sharing between the first device 12 with an intuitive interface 16 and at least a second device 14 with an intuitive interface 16, and sending a signal to the second device 14 to determine whether the second device 14 includes a system 10 for proximity based ad-hoc data sharing across the first and second devices 12, 14 and to determine whether the first device 12 is in range of communication of the second device 14. The instructions may also include receiving data into the intuitive interface 16 on the first device 12 and sending the data from the intuitive interface 16 on the first device 12 to an intuitive interface 16 on the second device 14 using an intuitive interface 16 on the first device 12 without relying on an external communication network.

The instructions for the computer-readable medium may also include activating an interface such as, but not limited to a cut-to-device intuitive interface, a copy-to-device intuitive interface, and a paste-from-device intuitive interface and activating a single input device on the first device 12. The instructions for the computer-readable medium be such that activating the system is possible after text to be copied has been selected and a copy-to-device menu selection has been chosen. The instructions for the intuitive interface for the system in the first device may be stored within an operating system on the first device.

Furthermore, it is important to note that the methods described above may incorporate any of the functionality, devices, and/or features of the systems described above and are not intended to be limited to the description provided above. The methodology and techniques described with respect to the exemplary embodiments can be performed using a machine or other computing device within which a set of instructions, when executed, may cause the machine to perform any one or more of the methodologies discussed above. In some embodiments, the first device 12 or second device 14, or both, may be a machine that operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device. The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangements disclosed as the best mode contemplated for carrying out this invention, but that the invention will include all embodiments and arrangements falling within the scope of the appended claims.

I claim:

1. A method of transferring data between devices with interfaces via a short range wireless communication system, comprising:

activating, by utilizing instructions stored in memory and executed by a processor, an interface on a first device comprising a system for proximity based ad-hoc data sharing between the first device with the interface and a second device with an interface;

sending a signal to the second device to determine whether the second device comprises a system for proximity based ad-hoc data sharing across the first and second devices and to determine whether the first device is in range of communication of the second device;

receiving data into the interface on the first device, wherein the data is received at a current cursor location on the interface on the first device; and sending the data from the interface on the first device to the interface on the second device using the interface on the first device without relying on an external communication network.

2. The method of transferring data between devices of claim 1, wherein sending the signal to the second device comprises establishing a wireless communication channel between the first and second devices.

3. The method of transferring data between devices of claim 2, wherein establishing the wireless communication channel between the first and second devices comprises establishing the wireless communication channel via the short range wireless communication system.

4. The method of transferring data between devices of claim 1, wherein activating the interface on the first device comprises activating an interface selected from the group consisting of a cut-to-device interface, a copy-to-device interface, and a paste-from-device interface.

5. The method of transferring data between devices of claim 1, wherein activating the interface on the first device comprises activating a single input device on the first device.

6. The method of transferring data between devices of claim 5, wherein activating the interface on the first device via activating the single input device comprises clicking a single input button on the first device.

7. The method of transferring data between devices of claim 5, wherein activating the interface on the first device is possible after text to be copied has been selected and a copy-to-device menu selection has been chosen.

8. The method of transferring data between devices of claim 1, further comprising activating a menu including a cut-to-device function and a copy-to-device function when the second device is determined to be within range of the first device.

9. The method of transferring data between devices of claim 1, further comprising receiving the data from the interface on the second device on the interface on the first device such that the information is received on the first device at the current cursor location by activating a paste-from-device interface.

10. The method of transferring data between devices of claim 1, wherein activating the interface on the first device comprises activating an interface on the first device, wherein the first device is homogeneous with the second device.

11. The method of transferring data between devices of claim 1, wherein activating the interface on the first device comprises activating an interface on the first device, wherein the first device is heterogeneous with the second device.

12. The method of transferring data between devices of claim 1, wherein instructions for the interface on the first device are stored within an operating system on the first device.

13. The system for transferring data between devices of claim 1, wherein the first device receives the data at the current cursor location on the interface of the first device by activating a paste-from-device interface, wherein the data is received from the interface on the second device.

14. The system for transferring data between devices of claim 1, wherein the first device is heterogeneous with the second device.

15. A system for transferring data between devices with interfaces via a short range wireless communication system, comprising:
 a memory that stores instructions;
 a first device that executes the instructions to perform operations comprising:
  activating an interface on the first device having a system for proximity based ad-hoc data sharing between the first device with the interface and a second device with an interface;
  sending a signal to the second device to determine whether the second device includes a system for proximity based ad-hoc data sharing across the first and second devices and to determine whether the first device is in range of communication of the second device;
  receiving data into the interface on the first device, wherein the data is received at a current cursor location on the interface on the first device; and
  sending the data from the interface on the first device to the interface on the second device using the interface on the first device without relying on an external communication network.

16. The system for transferring data between devices of claim 15, wherein the interface of the first device is selected from the group consisting of a cut-to-device interface, a copy-to-device interface, and a paste-from-device interface, and wherein the interface is stored within an operating system on the first device.

17. The system for transferring data between devices of claim 15, wherein the interface on the first device is stored within an operating system on the first device and is activated with a single input device on the first device.

18. The system for transferring data between devices of claim 15, wherein the interface is activated on the first device after text to be copied has been selected and a copy-to-device menu selection has been chosen.

19. A non-transitory computer-readable device comprising instructions, which, when loaded and executed by a processor causes the processor to perform operations to transfer data between devices with interfaces-via a short range wireless communication system, the operations comprising:
 activating an interface on a first device having a system for proximity based ad-hoc data sharing between the first device with the interface and a second device with an interface;
 sending a signal to the second device to determine whether the second device includes a system for proximity based ad-hoc data sharing across the first and second devices and to determine whether the first device is in range of communication of the second device;
 receiving data into the interface on the first device, wherein the data is received at a current cursor location on the interface on the first device; and
 sending the data from the interface on the first device to the interface on the second device using the interface on the first device without relying on an external communication network.

20. The non-transitory computer-readable device of claim 19, wherein activating the interface on the first device comprises activating an interface selected from the group consisting of a cut-to-device interface, a copy-to-device interface, and a paste-from-device interface, wherein activating the interface on the first device comprises activating a single input device on the first device and activating is possible after text to be copied has been selected and a copy-to-device menu selection has been chosen, and wherein the interface in the first device is stored within an operating system on the first device.

* * * * *